United States Patent [19]

Taguchi

[11] 4,174,522

[45] Nov. 13, 1979

[54] COMPOSITE COLOR SIGNAL-HANDLING CIRCUIT

[75] Inventor: Shinichiro Taguchi, Fukaya, Japan

[73] Assignee: Tokyo Shibaura Electric Co., Ltd., Kawasaki, Japan

[21] Appl. No.: 841,598

[22] Filed: Oct. 12, 1977

[30] Foreign Application Priority Data

Oct. 16, 1976 [JP] Japan .................. 51-123432

[51] Int. Cl.$^2$ .............................................. H04N 9/12
[52] U.S. Cl. ............................................................ 358/35
[58] Field of Search ........................ 358/27, 28, 35, 40

[56] References Cited

FOREIGN PATENT DOCUMENTS 4939327   4/1974   Japan .......................................... 358/35
501850   1/1975   Japan .......................................... 358/35

*Primary Examiner*—Robert L. Richardson
*Attorney, Agent, or Firm*—Cushman, Darby & Cushman

[57] ABSTRACT

A composite color signal-handling circuit comprising a phase-shifter for shifting the phase of a composite color signal; a first gate circuit for extracting a chrominance signal out of an output signal from the phase shifter; a second gate circuit for extracting a burst signal out of said output signal from the phase-shifter; a circuit for controlling the amplitude of a chrominance signal extracted by the first gate circuit; a circuit for controlling the phase of a burst signal extracted by the second gate circuit; and means for composing together output signals from the amplitude-controlling circuit and phase-controlling circuit for reproducing a composite color signal, and wherein means is provided to minimize a difference between phase distortions occurring in a first signal transmission line extending from the first gate circuit to the composite color signal-reproducing means and a second signal transmission line extending from the second gate circuit to the composite color signal-reproducing means.

4 Claims, 5 Drawing Figures

COMPOSITE COLOR SIGNAL-HANDLING CIRCUIT

BACKGROUND OF THE INVENTION

This invention relates to a composite color signal-handling circuit, having a hue-controlling circuit which can always be set to a desired demodulated phase. With the signal-handling circuit of the prior art color television receiving set, a burst signal constituting a reference used to demodulate the phase of a chrominance signal and a chrominance signal whose phase is to be demodulated are transmitted to a succeeding stag through different routes, respectively, giving rise to a difference between the phase distortions of the burst signal and chrominance signal and in consequence errors in the demodulated phase of a chrominance signal. In the prior art color TV set, it is known that, when the chrominance of the reproduced image is changed by controlling the amplitude of the chrominance signal applied to a demodulator, the phase of the chrominance signal is also inevitably changed. It is disadvantageous that the color-control operation results in the change of the hue of the reproduced color. This phenomenon is caused for the following reasons in the prior color TV set in which the hue and the chrominance are DC-controlled in an integrated circuit. The reason is known to be that the points at which circuit elements such as transistors and diodes are operated by D.C. to handle a chrominance signal for amplification vary with the level of control voltage, resulting in different effects on the parasitic capacity and A.C. characteristic of the circuit elements, thereby causing the phase of a passing chrominance signal to be shifted relative to that of a burst signal.

As mentioned above, the prior art signal-handling circuit has the drawback that since a burst signal and chrominance signal are transmitted through two different routes to a succeeding stage, respectively, the hue of a picture reproduced on a color television receiving set is displaced from the proper form.

SUMMARY OF THE INVENTION

This invention has been accomplished in view of the drawbacks of the prior art signal-handling circuit, and is intended to provide a novel signal-handling circuit wherein, after a composite color signal is separated into a burst signal and a chrominance signal, the burst and chrominance signals are coupled to hue-control and a color-control stages, respectively. Then, the burst signal and chrominance signal are recombined and conducted to a succeeding stage through the same route to eliminate difference between the phase distortions of the burst signal and the chrominance signal; hues are controlled within a narrow range; and hues are prevented from being changed even when color shades are adjusted. Further, even after the burst and chrominance signals are respectively hue and color-controlled, it is possible to equalize the DC levels of the burst signal and the chrominance signal.

According to one aspect of this invention there is provided a signal-handling circuit which comprises means for separating a composite signal into first and second component signals by time division; means for controlling the amplitude of the first signal component separated by said signal-separating means; means for controlling the phase of the second component signal separated by said signal-separating means; and means for adding together output signals from the phase-controlling means and amplitude-controlling means, whereby a difference between the phase distortions of the first and second component signals is eliminated.

This invention can be more fully understood from the following detailed description when taken in conjunction with the accompanying drawings, in which:

DESCRIPTION OF THE PREFERRED EMBODIMENTS

Figure 1:
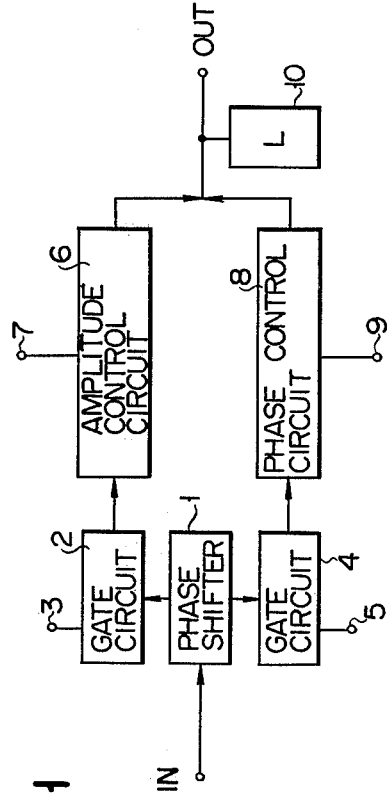
FIG. 1 shows a block diagram of a signal-handling circuit according to one embodiment of this invention.

There will now be described a signal-handling circuit according to one embodiment of this invention by reference to FIG. 1 showing a block diagram of said circuit. Reference numeral IN denotes an input terminal of a time shared composite color signal consisting of a chrominance signal and a burst signal. Numeral 1 shows a phase-shifter for rotating the phase of a composite color signal. Numeral 2 indicates a gate circuit for only allowing the passage of a chrominance signal induced in a composite color signal in response to a gate pulse supplied through a terminal 3. Numeral 4 represents a gate circuit for only allowing the passage of a burst signal included in the composite color signal in response to a burst gate pulse supplied through a terminal 5. Numeral 6 is an amplitude-controlling circuit for controlling the amplitude of a chrominance signal by voltage impressed on a terminal 7. Numeral 8 is a phase-controlling circuit for controlling the phase of a burst signal by voltage impressed on a phase control voltage terminal 9. Numeral 10 is a load for forming a composite color signal from a chrominance signal delivered from the amplitude-controlling circuit 6 and a burst signal supplied from the phase-controlling circuit 8 and then leading out the composite color signal through an output terminal OUT.

With the signal-handling circuit of this invention arranged as described above, a composite color signal which has passed through the phase-shifter 1 is divided into a chrominance signal and burst signal by the gate circuits 2, 4. The amplitude of the chrominance signal is controlled by the amplitude-controlling circuit 6. The phase of the burst signal is controlled by the phase-controlling circuit 8. The chrominance signal and burst signal are formed into a composite signal by the load 10.

In contrast, with the prior art signal-handling circuit, the amplitude-controlled chrominance signal and the phase-controlled burst signal are transmitted through separate routes to a succeeding stage, respectively, without being recombined. Since signal phases are distorted in different degrees in the separate transmission routes, a difference arises between the modulated phases of the chrominance signal and burst signal, resulting in the loss of the proper hue of a picture reproduced on a color television receiving set.

With the signal-handling circuit of this invention, however, the chrominance signal and burst signal subjected to the prescribed control are formed into a composite signal and conducted to the succeeding section in this state. Therefore, a difference between the phase distortions of the chrominance signal and burst signal is eliminated, reproducing a picture with a proper hue.

Figure 2:
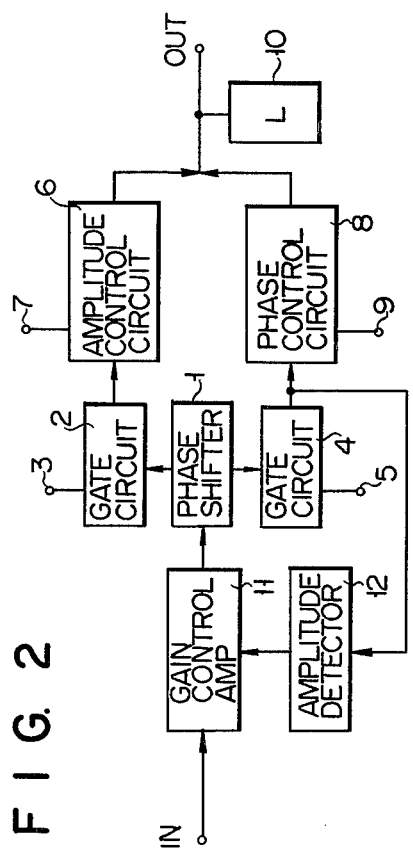
FIG. 2 is a block diagram showing a signal-handling circuit according to another embodiment of this invention.

There will now be described a signal-handling circuit according to another embodiment of this invention by reference to FIG. 2 showing the block diagram of said circuit. The parts of FIG. 2 the same as those of FIG. 1 are denoted by the same numerals, detailed description thereof being omitted. Referring to FIG. 2, numeral 12 denotes an amplitude detector for generating detection voltage proportional to the amplitude of a burst signal separated from a composite color signal by the gate circuit 4. Numeral 11 shows a gain-controlling amplifier supplied with a gain being controlled by said detection voltage. The second embodiment of FIG. 2 is different from the first embodiment of FIG. 1 in that the gain-controlling amplifier 11 is connected between the input terminal IN and phase-shifter 1; and the amplitude detector 12 is connected between the gain-controlling amplifier 11 and the output terminal of the gate circuit 4. According to this circuit arrangement, the phase-shifter 1, gate circuit 4, amplitude detector 12 and gain-controlling amplifier 11 jointly constitute a closed loop for automatically controlling gains in amplitude. This loop has the effect of setting the amplitudes of the burst signal and chrominance signal respectively at certain levels.

Figure 3:
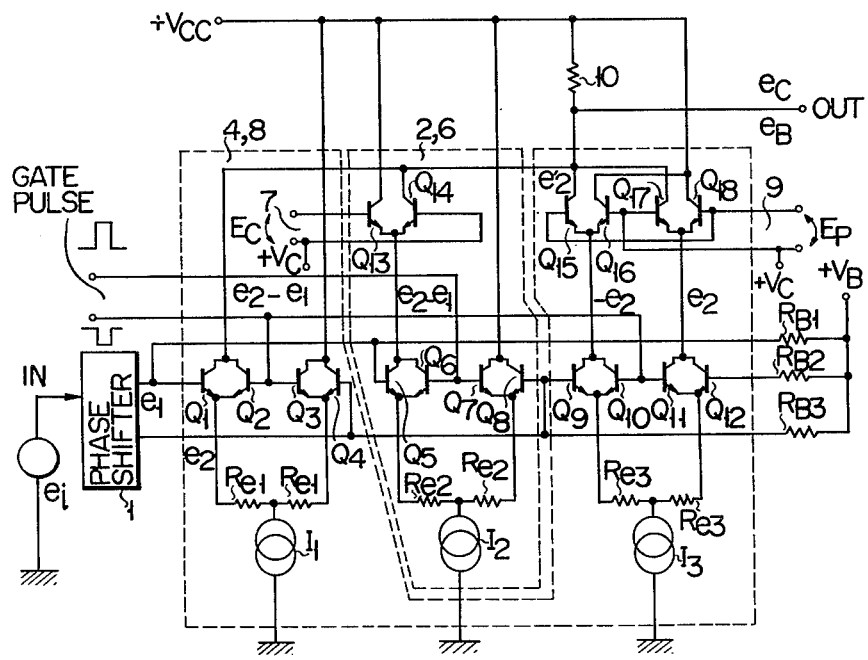
FIG. 3 is a circuit diagram showing a concrete circuit of a signal-handling circuit embodied with the aspect of this invention.

There will now be described by reference to FIG. 3 the concrete circuit arrangement of the signal-handling circuit of this invention. Blocks enclosed in broken lines are denoted by the numerals of the corresponding blocks of FIG. 1. A composite color signal $e_i$ supplied to the input terminal IN is conducted to the phase-shifter 1 to be converted by phase shifting into a referential composite color signal $e_i$ and a composite color signal $e_2$ whose phase is delayed by the prescribed extent (for example, 45°) from the referential composite color signal $e_1$. The composite color signals $e_1$, $e_2$ are supplied to a block 4-8 enclosed in broken lines. During a burst signal period, only a burst signal is extracted out of said composite color signals $e_1$, $e_2$ by the gating action of the corresponding two pairs of transistors $Q_2$–$Q_3$ and $Q_{10}$–$Q_{11}$. The burst signals separated from the composite color signals $e_1$, $e_2$ are respectively supplied to two differential amplifiers, one of which is formed of transistors $Q_1$, $Q_4$ and constant current source $I_1$, and the other of which is formed of transistors $Q_9$, $Q_{12}$ and constant current source $I_3$. At this time, the transistors $Q_2$, $Q_3$, $Q_{10}$, $Q_{11}$ remain inoperative. During a chrominance signed period, transistors $Q_2$, $Q_3$, $Q_{10}$, $Q_{11}$ are turned ON, and transistors $Q_1$, $Q_4$, $Q_9$, $Q_{12}$ remain inoperative. As a result, no signal appears at the collectors of transistors $Q_1$, $Q_4$, $Q_9$, $Q_{12}$ during the chrominance signal period. A vector representing an amplitude difference $e_2-e_1$ between both composite color signals $e_2$, $e_1$ appears at the collector of the transistor $Q_1$ connected to the load resistor 10. A signal $-e_2$ inverted from the composite color signal $e_2$ appears at the collector of the transistor $Q_9$. The signal $-e_2$ conducted to the collector of the transistor $Q_9$ and the signal $e_2$ supplied to the collector of the transistor $Q_{12}$ are sent forth to the respective common emitter terminals of two pairs of transistors $Q_{15}$–$Q_{16}$ and $Q_{17}$–$Q_{18}$ constituting a double balanced type differential amplifier. The relative absolute values of the vector signals $-e_2$, $e_2$ supplied to the transistors $Q_{15}$, $Q_{18}$ respectively are controlled by control voltage ($E_P$) impressed on the terminal 9. A composite signal $e'_2$ formed of said vector signals $-e_2$, $e_2$ is conducted to the collector of the transistor $Q_{15}$. The vector signal ($e_2-e_1$) which is delivered from the transistor $Q_1$ is further supplied to the collector of this transistor $Q_{15}$. The composite vector signal $[(e_2-e_1)+e'_2]$ whose phase has been controlled by composition is conducted to the load resistor 10. Therefore, the load resistor 10 is supplied with a burst signal $e_B$ whose phase has been controlled to an optional level by control voltage ($E_P$) impressed on the phase control voltage terminal 9. The burst signal $e_B$ is sent forth from the output terminal OUT while a gate pulse is issued to transistors $Q_2$, $Q_3$, $Q_{10}$, $Q_{11}$. Only a chrominance signal is extracted from the composite color signals $e_1$, $e_2$ received through the phase-shifter 1 during a period other than that in which a gate pulse is supplied to the gate of a block 2-6 enclosed in broken lines. The chrominance signal is delivered from a differential amplifier constituted by the transistors $Q_5$, $Q_8$ and constant current source $I_2$. A signal representing an amplitude difference $e_2-e_1$ between the composite color signals $e_1$, $e_2$ is delivered from the collector of the transistor $Q_5$. This amplitude difference signal $e_2-e_1$ has its amplitude controlled by the amplitude control circuit 6 formed of the transistors $Q_{13}$, $Q_{14}$, and later is led out through the load resistor 10. Drawn off from the output terminal OUT is an output chrominance signal $e_C$ whose amplitude has been controlled to an optional level by control voltage ($E_c$) impressed on the amplitude control voltage terminal 7 during a period other than that in which a gate pulse is issued.

With the phase-controlling circuit, the vector components $e_2$, $-e_2$ are substantially combined to zero at the collector of the transistor $Q_{15}$ with respect to the central or half value of the control voltage impressed on the phase control voltage terminal 9. Substantially, therefore, only the transistors $Q_1$ to $Q_8$, $Q_{13}$, $Q_{14}$ are used to transmit a composite color signal. Namely, the burst signal is conducted to the load resistor 10 through the transistor $Q_1$. The chrominance signal is supplied to said load resistor 10 through the transistors $Q_5$, $Q_{14}$. At this time, either of the respective pairs of the transistors $Q_1$–$Q_2$, $Q_3$–$Q_4$, $Q_5$–$Q_6$ and $Q_7$–$Q_8$ makes a switching action. However, the circuits through which the burst signal and chrominance signal are conducted have substantially the same arrangement. As the result, phase distortion may occur in the burst signal and chrominance signal due to, for example, a floating capacity, but a difference does not arise between the demodulated phases of said burst signal and chrominance signal. This means that where a hue is controlled to a desired form by voltage control of the phase of the burst signal, a collectors of hue can always be obtained with respect to the central or half value of the control voltage. Since a difference between the demodulated phases of the burst signal and chrominance signal is eliminated, the central form of a hue is not subject to variations. D.C. voltage of the collectorsof the transistors $Q_1$, $Q_{14}$, $Q_{15}$, $Q_{17}$ varies with the amplitude control voltage, leading to changes in the A.C. characteristic of these transistors and consequently in the phase of a signal supplied to said collectors. Since, however, the phases of both chrominance signal $e_C$ and output burst signal $e_B$ vary to the same extent, a hue does not change even when its shade is adjusted. The phase vector of a signal obtained at the output terminal is rotated when said signal is transmitted to the succeeding circuit. Since, at this time, too, the burst signal and chrominance signal are transmitted through the same route, a difference does not take place between the phase distortions of the burst signal and chrominance signal.

Figure 4:
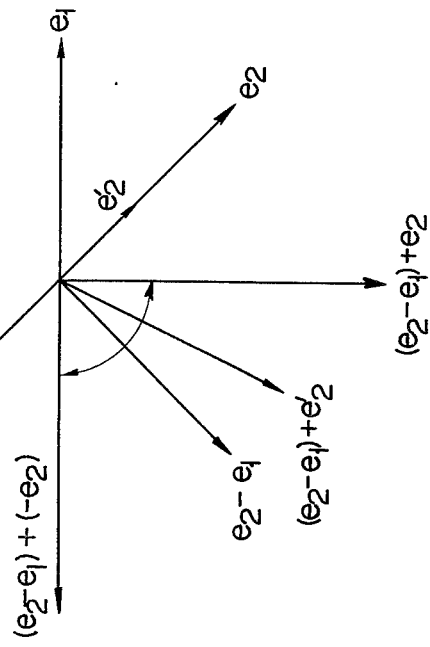
FIG. 4 shows a vector diagram for explaining the operation of the circuit shown in FIG. 3.

There will now be described the above-mentioned characteristic feature of the present invention by reference to FIG. 4. $e_1$ is a vector representing the referential phase of a composite color signal before its phase is shifted by a phase-shifter 1. $e_2$ is a vector showing said composite color signal whose phase has been delayed by the phase-shifter. $e_2-e_1$ is a fixed vector appearing at the load resistor 10 through the collector of the transistor $Q_1$. $-e_2$, $e_2$ are respectively the vectors of the signals which appear at the transistors $Q_{15}$, $Q_{18}$ after passing through the gate circuit 4. The vectors $-e_2$, $e_2$ are composed when the absolute values thereof are controlled by the voltage $E_P$ impressed on the phase control voltage terminal 9. Now let it be assumed that $e'_2$ represents a vector obtained with the absolute values of the vectors $-e_2$, $e_2$ are controlled by the voltage impressed on the phase control voltage terminal 9. At this time the fixed vector $(e_2-e_1)$ and the vector $e'_2$ are composed together at the load resistor 10. Thus, the phase of the burst signal is represented by a vector $(e_2-e_1)+e'_2$. As mentioned above, the phase of the burst signal is controlled by the voltage impressed on the phase control voltage terminal 9. In this case, the range in which the phase of the burst signal is shifted lies in the vector $(e_2-e_1)+e'_2$, while, the variable range of the burst signal phase lies between the phase of the vector $(e_2-e_1)+e_2$ and that of the vector $(e_2-e_1)+(-e_2)$. Since the resistor 10 operates as a common load of the circuits 4,8; 2,6, if values of the currents of the current sources $I_1$, $I_2$ and $I_3$ are made equal, the DC levels of the burst and chrominance signals combined at the resistor 10 can be made equal to each other.

Figure 5:
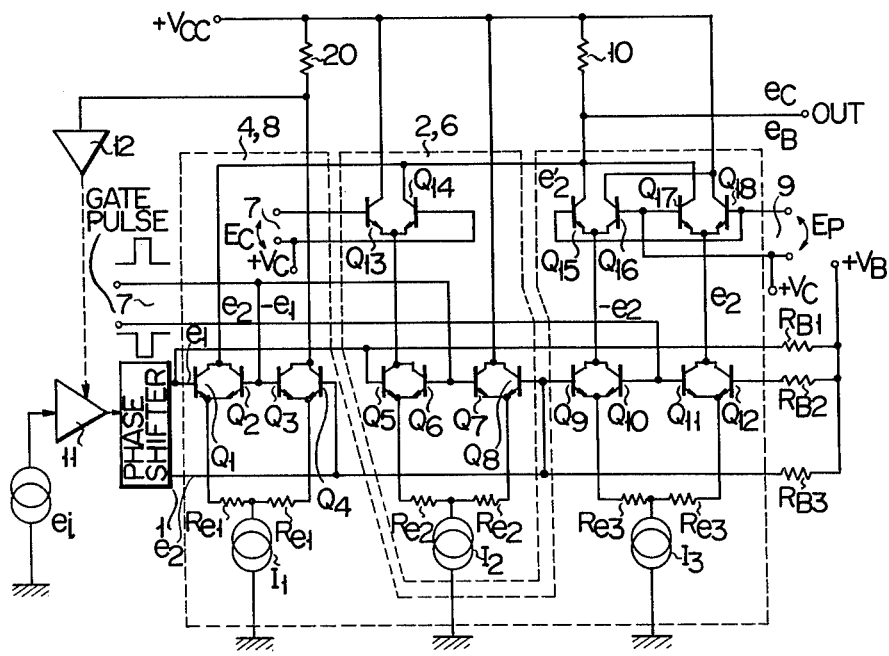
FIG. 5 is a circuit diagram showing another concrete circuit of a signal-handling circuit of this invention.

FIG. 5 shows the concrete arrangement of a signal-handling circuit according to another embodiment of this invention. The parts of FIG. 5 the same as those of FIG. 3 are denoted by the same numerals, detailed description thereof being omitted. A load resistor 20 is connected between the collector of the transistor $Q_4$ and the power source $+V_{cc}$. The collector of the transistor $Q_4$ is connected to the amplitude detector 12. The composite color signal $e_i$ is supplied through the input terminal IN to the gain-controlling amplifier 11 controlled by a detection signal sent forth from the amplitude detector 12. An output from the gain-controlling amplifier 11 is conducted to the phase-shifter 1. Description is not given of the other parts of FIG. 5 which are of the same type as those of FIG. 3. Description is only given of the parts which are newly added to the embodiment of FIG. 5. As in the circuit of FIG. 3, the load resistor 20 is supplied with a burst signal corresponding to a vector representing a difference between the vectors of a composite color signal $e_1$ of the referential phase which is supplied through the phase-shifter 1 and a composite color signal $e_2$ whose phase has been delayed from that of the aforesaid composite color signal $e_1$ by the prescribed extent. In this case, variations taking place in the property of the phase-shifter 1 and consequently in the phases of the composite color signals $e_1$, $e_2$ lead to changes in the amplitude of a burst signal brought to the load resistors 10, 20 or that of a chrominance signal. With the embodiment of FIG. 5, therefore, a burst signal appearing at the load resistor 20 is conducted to the amplitude detector 12 to be converted into detection voltage proportional to the detected amplitude. The detection voltage is impressed on the gain-controlling amplifier 11 to control gains therein, thereby changing the amplitude of a composite color signal supplied to the phase-shifter 1. As the result, variations in the property of the phase-shifter 1 are absorbed, causing the output terminal OUT to generate a burst signal $e_B$ and chrominance signal $e_C$ whose amplitudes have been controlled to the prescribed levels.

This invention provides a composite color signal-handling circuit, which, as previously mentioned, has the advantages that it is possible to eliminate a difference between the phase distortions of a burst signal and chrominance signal caused by irregularities in the property of the phase-shifter constituting the signal transmission line of the hue-controlling circuit and the color-controlling circuit; the burst signal constituting a reference used to demodulate phases and the chrominance signal are separated from a composite color signal, coupled to hue and color-control stages, respectively, and recombined so as to be handled through the same route, thereby preventing a hue from being changed when its shade is varied; when transmitted to the succeeding handling circuit, the burst signal and chrominance change in phase at the same time and in the same degree, making it possible to control the hue without being affected by the control of the shade of a color; the shade of a color can be adjusted without changing the hue, thereby improving the quality of a picture reproduced on a color television receiving set. Further, this invention is advantageous in that the burst signal and the chrominance signal can be combined at the same DC levels, even after the burst and chrominance signals have been hue and color controlled, respectively.

What is claimed is:

1. A signal-handling circuit comprising: means for separating a composite signal into first and second component signals by time division; means for controlling the amplitude of said first signal component separated by said signal-separating means; means for controlling the phase of said second component signal separated by said signal-separating means; and means for adding together output signals from said means for controlling the phase and from said means for controlling the amplitude, whereby a difference between the phase distortions of said first and second component signals is eliminated.

2. The signal-handling circuit according to claim 1, wherein said signal-separating means comprises a phase-shifter for shifting the phase of said composite signal; and gate means for dividing the phase-shifted composite signal into said first and second component signals.

3. The signal-handling circuit according to claim 1 wherein said composite signal formed of time-divided component signals is a composite color signal.

4. A signal-handling circuit comprising a gain-controlling circuit supplied with a composite color signal; a phase-shifter for shifting the phase of an output from said gain control circuit to a predetermined level; a first gate circuit for extracting a burst signal out of an output signal from said phase-shifter; a phase-controlling circuit for controlling the phase of said burst signal extracted by said first gate circuit; a second gate circuit for extracting a chrominance signal out of an output from said phase-shifter; an amplitude-controlling circuit for controlling the amplitude of an output from said second gate circuit; means for adding together an output from said amplitude-controlling circuit and an output from said phase-controlling circuit; and an amplitude-detecting circuit which is connected between the output terminal of said first gate circuit and the gain-controlling terminal of said gain-controlling circuit to detect the amplitude of said burst signal, whereby a difference between the phase distortions of said burst signal and said chrominance signal is eliminated; and automatic color control is reliably effected by said gain control, phase-shifter and amplitude-detecting circuits.

* * * * *